United States Patent
Hsieh

(10) Patent No.: US 11,309,797 B2
(45) Date of Patent: Apr. 19, 2022

(54) VOLTAGE REGULATION SYSTEM AND METHOD THEREOF

(71) Applicant: NUVOTON TECHNOLOGY CORPORATION, Hsinchu (TW)

(72) Inventor: Chung-Ming Hsieh, Zhubei (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 49 days.

(21) Appl. No.: 17/006,241

(22) Filed: Aug. 28, 2020

(65) Prior Publication Data

US 2021/0320588 A1 Oct. 14, 2021

(30) Foreign Application Priority Data

Apr. 9, 2020 (TW) ................................. 109112068

(51) Int. Cl.
  *H02M 3/158* (2006.01)
  *H02M 3/156* (2006.01)

(52) U.S. Cl.
  CPC ............ *H02M 3/158* (2013.01); *H02M 3/156* (2013.01)

(58) Field of Classification Search
  CPC ............. H02M 1/0003; H02M 1/0032; H02M 1/0035; H02M 1/0041; H02M 1/0048; H02M 1/0054; H02M 3/156; H02M 3/157; H02M 3/158; Y02B 70/00; Y02B 70/10
  See application file for complete search history.

(56) References Cited

U.S. PATENT DOCUMENTS

| 8,629,669 B2 * | 1/2014 | Tournatory | H02M 3/156 323/285 |
| 2015/0137778 A1 * | 5/2015 | Miyazaki | H02M 3/156 323/271 |
| 2017/0126119 A1 * | 5/2017 | Bernardon | H02M 3/157 |

\* cited by examiner

*Primary Examiner* — Matthew V Nguyen
(74) *Attorney, Agent, or Firm* — Snyder, Clark, Lesch & Chung, LLP

(57) ABSTRACT

A voltage regulation system utilizes a controller to select one of a continuous comparator and a discrete comparator to operate, making one of the continuous comparator and the discrete comparator output a pulse signal to the controller. The controller controls a switched power stage circuit to supply power to a load element. Through the aforementioned configuration, the switched power stage circuit adjusts the power supply based on the condition of the load element, thus decreasing the power loss of the switched power stage circuit.

12 Claims, 6 Drawing Sheets

VOLTAGE REGULATION SYSTEM AND METHOD THEREOF

CROSS-REFERENCE TO RELATED APPLICATION

This application claims priority from Taiwan Patent Application No. 109112068, filed on Apr. 9, 2020, in the Taiwan Intellectual Property Office, the content of which is hereby incorporated by reference in its entirety for all purposes.

BACKGROUND

1. Technical Field

The present disclosure relates to a voltage regulation system and a method thereof utilizing a controller to select one of a continuous comparator and a discrete comparator to operate and control the output of the switched power stage circuit.

2. Description of the Related Art

In the era of the prevalence of electronic technology, all electronic devices have specific voltage requirements. Therefore, a voltage regulator is needed to adjust voltages to accord with the specification thereof. Voltage regulators commonly used on the market are switched voltage regulators. The switched voltage regulator generates less heat, and steadily outputs voltages to a load element by switching a switch element therein to adjust the voltage. However, the existing voltage regulators fail to adjust the power supply condition based on the condition of the load element, and it causes increasing of power loss of the switched power stage circuit.

In summary, the inventor of the present disclosure has designed a voltage regulation system, which copes with the defects presented in the prior art and will further improve the practical implementation in industries.

SUMMARY

According to the problems mentioned above, the subject of the present disclosure is to provide a voltage regulation system to solve the conventional problems.

Based on the above, the present disclosure provides a voltage regulation system, including a switched power stage circuit, a continuous comparator, a discrete comparator, a clock generator, and a controller. The switched power stage circuit is configured to supply power to a load element, wherein a voltage on an output end of the switched power stage circuit is defined as an output voltage. The continuous comparator is connected to the switched power stage circuit and configured to compare the output voltage and a reference voltage to output a pulse signal. The discrete comparator is connected to the switched power stage circuit and configured to compare the output voltage and the reference voltage to output the pulse signal. The clock generator is configured to output a clock signal to the discrete comparator, wherein the discrete comparator is operated based on the clock signal. The controller is connected between the discrete comparator and the switched power stage circuit and connected between the continuous comparator and the switched power stage circuit, wherein the controller controls the switched power stage circuit to supply power to the load element based on the pulse signal and selectively dynamically turns on one of the continuous comparator and the discrete comparator and turns off the other of the continuous comparator and the discrete comparator.

In an embodiment of the present disclosure, the controller includes a counter. When the continuous comparator is turned on and the discrete comparator is turned off, the counter counts a count value for an interval between the two continuous pulse signals, and when the count value is greater than a first threshold value, the controller turns off the continuous comparator and turns on the discrete comparator.

In an embodiment of the present disclosure, when the continuous comparator is turned off and the discrete comparator is turned on, the counter counts the count value for the interval between the two continuous pulse signals, and when the count value is smaller than a second threshold value, the controller turns on the continuous comparator and turns off the discrete comparator.

In an embodiment of the present disclosure, the second threshold value is smaller than the first threshold value.

In an embodiment of the present disclosure, the counter counts based on the clock signal.

In an embodiment of the present disclosure, the continuous comparator and the discrete comparator are disposed independently from each other.

Based on the above, the present disclosure provides a voltage regulation method, including (1) providing a switched power stage circuit to supply power to a load element, wherein a voltage on an output end of the switched power stage circuit is defined as an output voltage; (2) selectively turning on one of a continuous comparator and a discrete comparator by using a controller, to compare the output voltage and a reference voltage to output a pulse signal, wherein the discrete comparator is operated based on a clock signal; and (3) controlling the switched power stage circuit to supply power to the load element based on the pulse signal.

In an embodiment of the present disclosure, the controller includes a counter, and the step of selectively turning on one of the continuous comparator and the discrete comparator by using the controller further includes: when the continuous comparator is turned on and the discrete comparator is turned off, using the counter to count a count value for an interval between the two continuous pulse signals, and when the count value is greater than a first threshold value, using the controller to turn off the continuous comparator and turn on the discrete comparator.

In an embodiment of the present disclosure, the step of selectively turning on one of the continuous comparator and the discrete comparator by using the controller further includes: when the continuous comparator is turned off and the discrete comparator is turned on, using the counter to count the count value for the interval between the two continuous pulse signals, and when the count value is smaller than a second threshold value, using the controller to turn on the continuous comparator and turn off the discrete comparator.

In an embodiment of the present disclosure, the second threshold value is smaller than the first threshold value.

In an embodiment of the present disclosure, the counter counts based on the clock signal.

In an embodiment of the present disclosure, the continuous comparator and the discrete comparator are disposed independently from each other.

Accordingly, through controlling the output of the continuous comparator and the discrete comparator, the voltage regulation system of the present disclosure adjusts the power supply of the switched power stage circuit, enabling the switching power supply stage circuit to adjust the power supply based on the condition of the load element, thus decreasing the power loss of the switched power stage circuit.

DESCRIPTION OF THE PREFERRED EMBODIMENTS

The advantages, features, and technical methods of the present disclosure are to be explained in detail with reference to the exemplary embodiments and the drawings for a better understanding of the present disclosure. Moreover, the present disclosure may be realized in different forms, and should not be construed as being limited to the embodiments set forth herein. Conversely, for a person of ordinary skill in the art, the embodiments provided shall make the present disclosure convey the scope more thoroughly, comprehensively, and completely. In addition, the present disclosure shall be defined only by the appended claims.

It should be noted that although the terms "first," "second," and the like may be used in the present disclosure to describe various elements, components, regions, layers and/or parts, these elements, components, regions, layers and/or parts should not be limited by these terms. These terms are only used to distinguish one element, component, region, layer, and/or part from another element, component, region, layer, and/or part. Hence, the "first element", "first component", "first region", "first layer", and/or "first part" discussed hereinafter may be referred to as "second component", "second region", "second layer", and/or "second part" without departing from the teachings of the present disclosure.

In addition, the terms "include" and/or "contain" are used to indicate the presence of features, regions, entirety, steps, operations, elements and/or components, but may not exclude the presence or addition of one or more of other features, regions, entirety, steps, operations, elements, components, and/or combinations thereof.

Unless otherwise defined, all terms (including technical and scientific terms) used in the present disclosure have the same meaning as those commonly understood by a person of ordinary skill in the art. It should be further understood that, unless explicitly defined herein, the terms such as those defined in commonly used dictionaries should be interpreted as having definitions consistent with their meaning in the context of the related art and the present disclosure, and should not be construed as idealized or overly formal.

Figure 1:
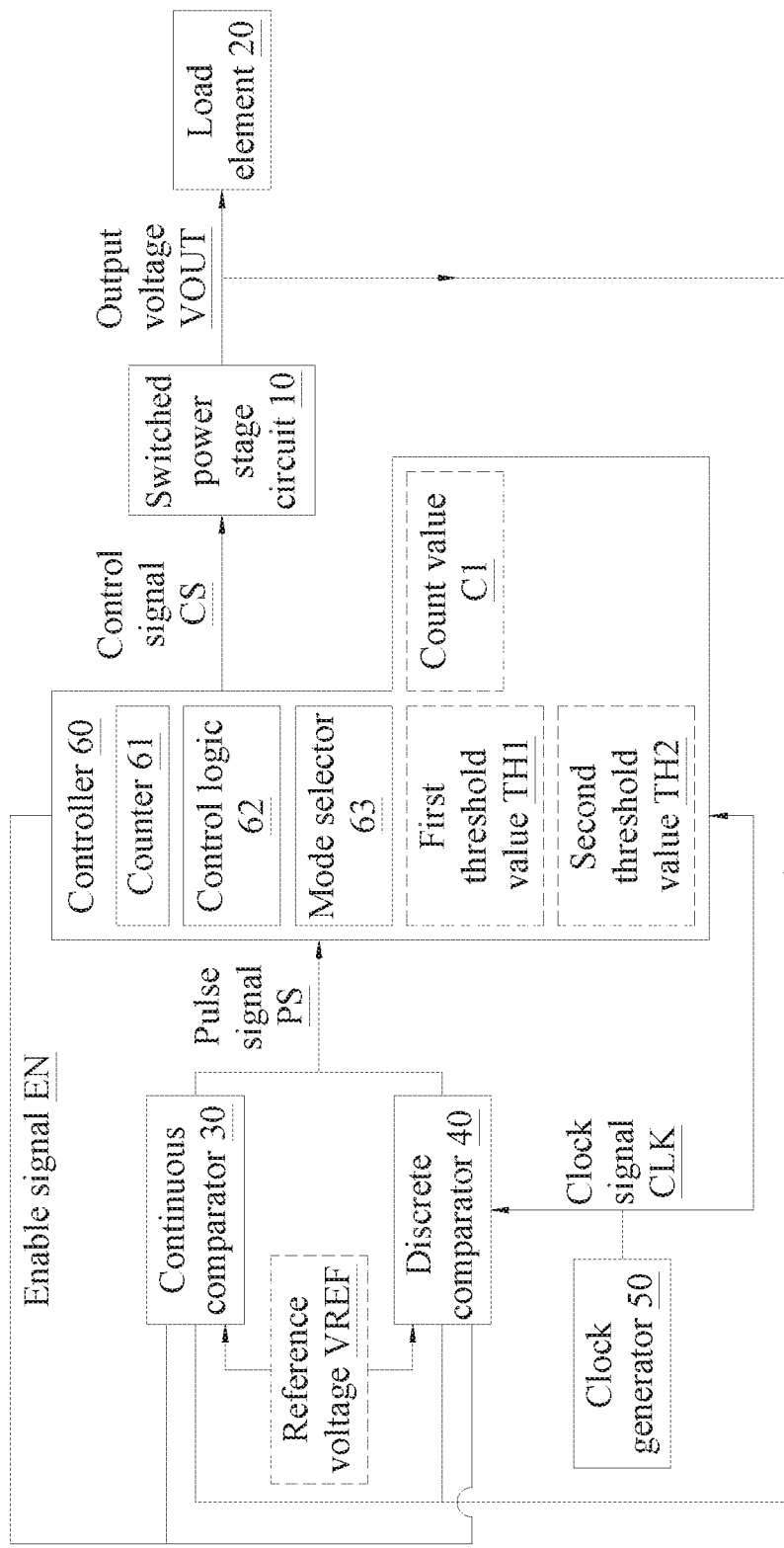
FIG. 1 is a block diagram of the first embodiment of the voltage regulation system according to the present disclosure.
Figure 2:
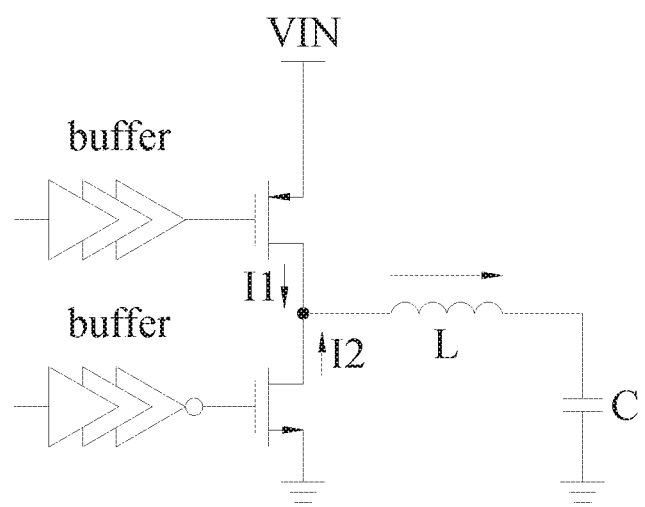
FIG. 2 is a circuit diagram of the switched power stage circuit of the first embodiment of the voltage regulation system according to the present disclosure.

Please refer to FIG. 1 and FIG. 2 which are a block diagram of the first embodiment of the voltage regulation system and a circuit diagram of the switched power stage circuit of the first embodiment of the voltage regulation system according to the present disclosure. As shown in FIG. 1 and FIG. 2, the voltage regulation system of the present disclosure includes a switched power stage circuit 10, a continuous comparator 30, a discrete comparator 40, a clock generator 50, and a controller 60. The switched power stage circuit 10 is configured to supply power to a load element 20, wherein a voltage on an output end of the switched power stage circuit 10 is defined as an output voltage VOUT. The continuous comparator 30 is connected to the switched power stage circuit 10 and configured to compare the output voltage VOUT and a reference voltage VREF to output a pulse signal PS. The discrete comparator 40 is connected to the switched power stage circuit 10 and configured to compare the output voltage VOUT and the reference voltage VREF to output the pulse signal PS. The clock generator 50 is connected to the discrete comparator 40 and the controller 60, and the clock generator 50 is configured to output a clock signal CLK to the discrete comparator 40 and the controller 60, wherein the discrete comparator 40 is operated based on the clock signal CLK. The controller 60 is connected between the discrete comparator 40 and the switched power stage circuit 10 and connected between the continuous comparator 30 and the switched power stage circuit 10, wherein the controller 60 controls the switched power stage circuit 10 to supply power to the load element 20 based on the pulse signal PS and selectively dynamically turns on one of the continuous comparator 30 and the discrete comparator 40 and turns off the other of the continuous comparator 30 and the discrete comparator 40.

The controller 60 includes a counter 61, a control logic 62, and a mode selector 63. The counter 61 counts the clock signal CLK of the interval between two consecutive pulse signals PS to obtain the count value C1. The mode selector 63 controls the activation of the continuous comparator 30 and the discrete comparator 40. One of the continuous comparator 30 and the discrete comparator 40 is turned on and the other is turned off. During the first mode, the mode selector 63 sends an enable signal EN to the continuous comparator 30, enabling the continuous comparator 30 to be turned on and the discrete comparator 40 to be turned off; during the second mode, the mode selector 63 sends an enable signal EN to the discrete comparator 40, enabling the discrete comparator 40 to be turned on and the continuous comparator 30 to be turned off. The control logic 62 sends a control signal CS to the switched power stage circuit 10 based on the pulse signal PS, enabling the switched power stage circuit 10 to operate.

Specifically, the switched power stage circuit 10 is formed of a transistor PMOS_SW, a transistor NMOS_SW, an inductance L, a capacitance C, and a buffer. VIN is an input voltage, IL is an inductive current, I1 is a current from the transistor PMOS_SW, and I2 is a current from the transistor NMOS_SW. The controller 60 outputs a control signal CS to the transistor PMOS_SW or the transistor NMOS_SW to turn on or off the transistor PMOS_SW and the transistor NMOS_SW. The switched power stage circuit 10 may also be other types of switched power stage circuits without being limited in the scope exemplified by the present disclosure. The continuous comparator 30 and the discrete comparator 40 are disposed independently from each other, and the continuous comparator 30 and the discrete comparator 40 operate independently.

Figure 3:
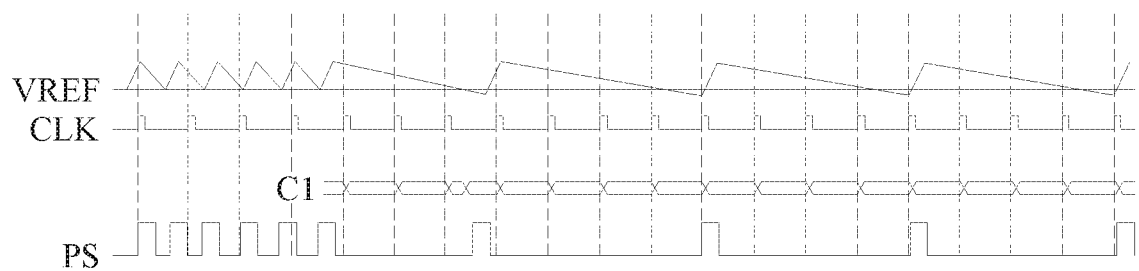
FIG. 3 is a waveform diagram of the first pulse signal of the first embodiment of the voltage regulation system according to the present disclosure.
Figure 4:
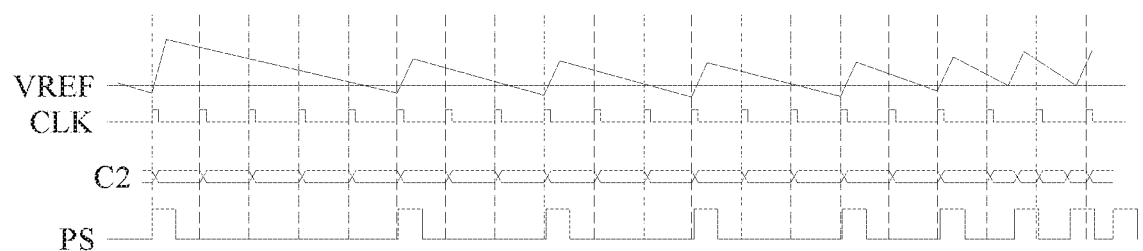
FIG. 4 is a waveform diagram of the second pulse signal of the first embodiment of the voltage regulation system according to the present disclosure.

Please refer to FIG. 3 and FIG. 4 which are a waveform diagram of the first pulse signal of the first embodiment of the voltage regulation system according to the present disclosure and a waveform diagram of the second pulse signal of the first embodiment of the voltage regulation system according to the present disclosure. FIG. 3 and FIG. 4 are explained with reference to FIG. 1 and FIG. 2 as follows. In the first mode, as shown in FIG. 3, the mode selector 63 sends an enable signal EN to the continuous comparator 30, enabling the continuous comparator 30 to be turned on and the discrete comparator 40 to be turned off. The switched power stage circuit 10 is configured to supply power to a load element 20, wherein a voltage on an output end of the switched power stage circuit 10 is defined as an output voltage VOUT. The continuous comparator 30 compares the output voltage VOUT and the reference voltage VREF to send a pulse signal PS to the controller 60. The counter 61 counts the clock signal CLK between two consecutive pulse signals PS to obtain a count value C1. When the controller 60 receives the first pulse signal PS1, the counter 61 starts counting; when the pulse signal PS is received again, the counter 61 restarts counting. The controller 60 compares the count value C1 with the first threshold value TH1. If the controller 60 determines that the count value C1 is greater than the first threshold value TH1, it indicates that the load element 20 may still operate normally at the moment, and the power supply condition of the switched power stage circuit 10 is normal. The mode selector 63 turns off the and sends an enable signal EN to the discrete comparator 40 to turn on the discrete comparator 40 to operate. Since the power loss of the continuous comparator 30 is higher than that of the discrete comparator 40, using the discrete comparator 40 for comparison can save more power under the condition that the load element 20 still operates normally.

In the second mode, as shown in FIG. 4, the mode selector 63 sends an enable signal EN to the discrete comparator 40, enabling the discrete comparator 40 to be turned on and the continuous comparator 30 to be turned off. The switched power stage circuit 10 supplies power to a load element 20, wherein a voltage on an output end of the switched power stage circuit 10 is defined as an output voltage VOUT. The discrete comparator 40 compares the output voltage VOUT and the reference voltage VREF to send a pulse signal PS to the controller 60. The counter 61 counts the clock signal CLK between two consecutive pulse signals PS to obtain a count value C1. When the controller 60 receives the pulse signal PS, the counter 61 starts counting; when the pulse signal PS is received again, the counter 61 restarts counting. The controller 60 compares the count value C1 with the second threshold value TH2. If the controller 60 determines that the count value C1 is smaller than the second threshold value TH2, it indicates that the load element 20 may operate abnormally at the moment and the power supply condition of the switched power stage circuit 10 is abnormal. The mode selector 63 turns off the discrete comparator 40 and sends an enable signal EN to the continuous comparator 30 to turn on the continuous comparator 30 to operate. Since the continuous comparator 30 can perform voltage comparison more frequently that the discrete comparator 40, using the continuous comparator 30 for comparison can facilitate the load element 20 still operates normally, particularly when the load element 20 is heavy.

In an embodiment, the second threshold value TH2 is smaller than the threshold value TH1; for example, the threshold value TH1 can be set as 4, and the second threshold value TH2 can be set as 2.

Figure 5:
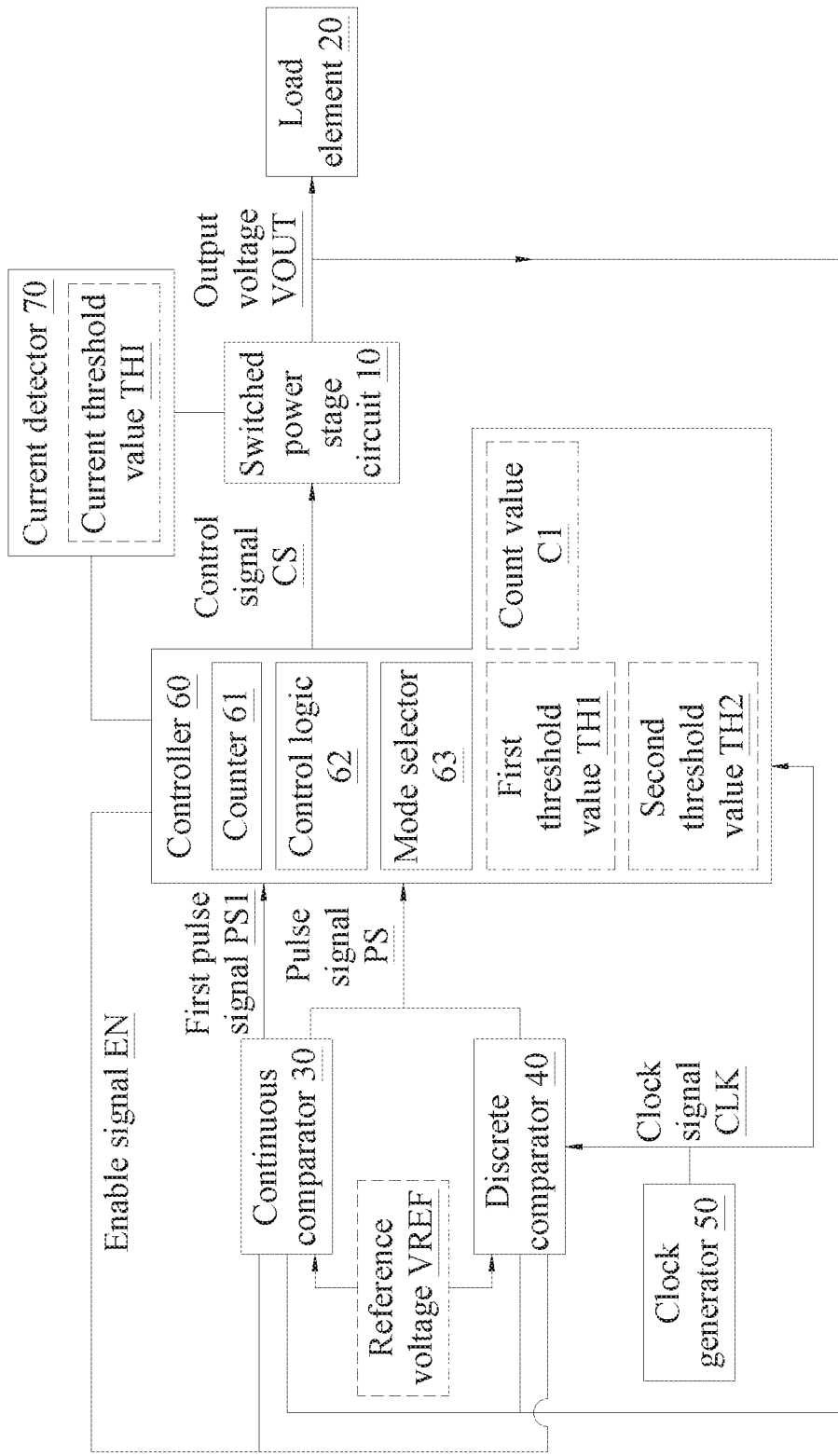
FIG. 5 is a block diagram of the first embodiment of the voltage regulation system according to the present disclosure.

Please refer to FIG. 5 which is a block diagram of the first embodiment of the voltage regulation system according to the present disclosure. In the embodiment, the configuration of the same components with the same numerals is similar to that described above, so the similar descriptions are not to be described herein.

As shown in FIG. 5, compared to the first embodiment, the second embodiment of the present disclosure further includes a current detector 70, and the current detector 70 is connected between the switched power stage circuit 10 and the controller 60. Herein, the detection mechanism of the current detector 70 is described with reference to FIG. 2 and FIG. 5 as follows. In the first condition, the control signal CS turns on the transistor PMOS_SW and turns off the transistor NMOS_SW, and the transistor PMOS_SW discharges the current I1 to charge the inductance L. The current detector 70 detects the current I1 and determines whether the current I1 is higher than the current threshold value TH1 and outputs the current detection result to the controller 60. If the current detector 70 determines that the current I1 is higher than the current threshold value TH1 and outputs the current detection result to the controller 60, the control signal CS sent by the controller 60 turns off the transistor PMOS_SW and turns on the transistor NMOS_SW.

In the second condition, the control signal CS turns on the transistor NMOS_SW and turns off the transistor PMOS_SW, and the transistor NMOS_SW discharges the current I2 to charge the inductance L. The current detector 70 detects the current I2 and determines whether the current I2 is zero and outputs the current detection result to the controller 60. If the current detector 70 determines that the current I2 is zero and outputs the current detection result to the controller 60, the control signal CS sent by the controller 60 turns off the transistor NMOS_SW and turns on the transistor PMOS_SW.

Figure 6:
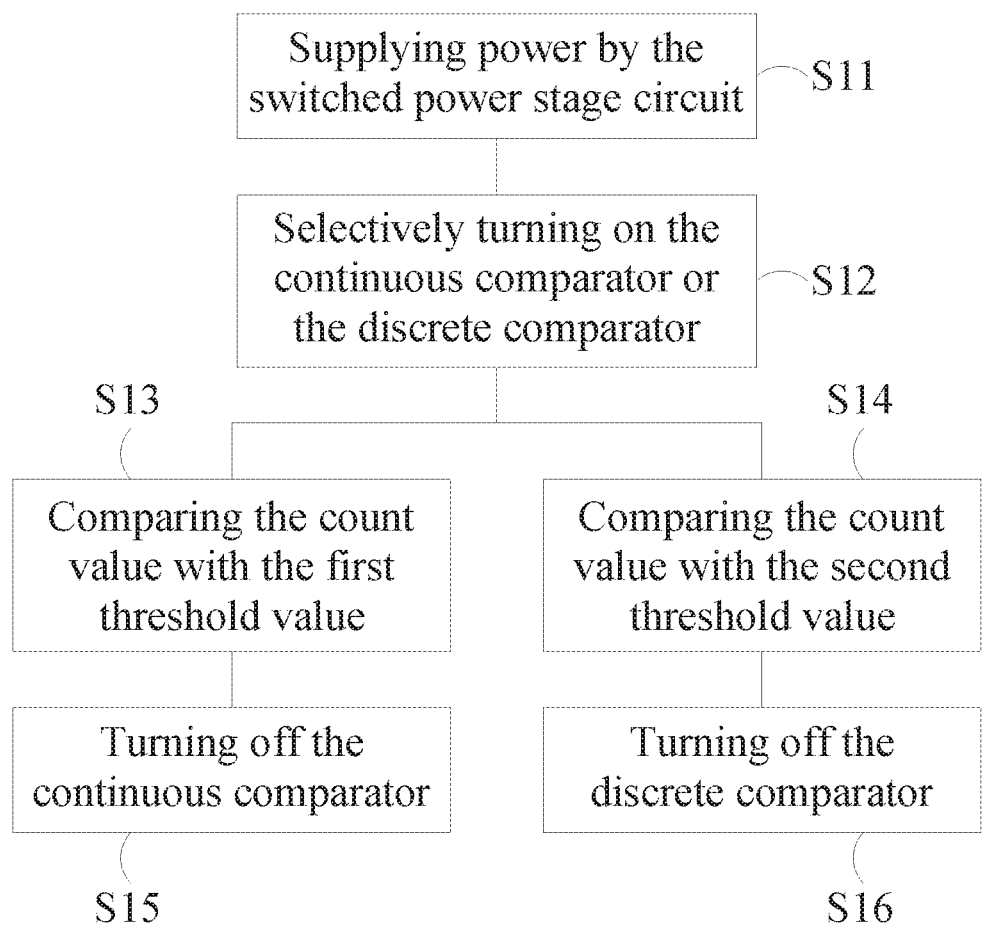
FIG. 6 is a flowchart of the voltage regulation method according to the present disclosure.

Please refer to FIG. 6 which is a flowchart of the voltage regulation method according to the present disclosure. As shown in FIG. 6, the voltage regulation method of the present disclosure is described with reference to FIG. 1 as follows.

Step S11: A switched power stage circuit 10 is provided to supply power to a load element 20, wherein a voltage on an output end of the switched power stage circuit 10 is defined as an output voltage VOUT.

Step S12: The activation of the continuous comparator 30 and the discrete comparator 40 is controlled by the mode selector 63, wherein one of the continuous comparator 30 and the discrete comparator 40 is turned on and the other is turned off. During the first mode, the mode selector 63 sends an enable signal EN to the continuous comparator 30, enabling the continuous comparator 30 to be turned on and the discrete comparator 40 to be turned off. Proceed to step S13. During the second mode, the mode selector 63 sends an enable signal EN to the discrete comparator 40, enabling the discrete comparator 40 to be turned on and the continuous comparator 30 to be turned off. Proceed to step S14.

Step S13: The continuous comparator 30 compares the output voltage VOUT and the reference voltage VREF to send the first pulse signal PS1 to the controller 60. The counter 61 counts the clock signal CLK between two consecutive pulse signals PS to obtain a count value C1. When the controller 60 receives the pulse signal PS, the counter 61 starts counting; when the pulse signal PS is received again, the counter 61 restarts counting. The controller 60 compares the count value C1 with the first threshold value TH1. If the controller 60 determines that the count value C1 is greater than the first threshold value TH1, proceed to step S15.

Step S14: The discrete comparator 40 compares the output voltage VOUT and the reference voltage VREF to send the pulse signal PS to the controller 60. The counter 61 counts the clock signal CLK between two consecutive pulse signals PS to obtain a count value C1. When the controller 60 receives the pulse signal PS, the counter 61 starts counting; when the pulse signal PS is received again, the counter 61 restarts counting. The controller 60 compares the count value C1 with the second threshold value TH2. If the controller 60 determines that the count value C1 is smaller than the second threshold value TH2, proceed to step S16.

Step S15: The mode selector 63 turns off the continuous comparator 30 and sends an enable signal EN to the discrete comparator 40 to turn on the discrete comparator 40 to operate.

Step S16: The mode selector 63 turns off the discrete comparator 40 and sends an enable signal EN to the continuous comparator 30 to turn on the continuous comparator 30 to operate.

Accordingly, through controlling the outputs of the continuous comparator 30 and the discrete comparator 40 by the controller 60, the voltage regulation system and the method thereof of the present disclosure adjusts the power supply of the switched power stage circuit 10, enabling the switched power stage circuit 10 to adjust the power supply based on the condition of the load element 20, thus decreasing the power loss of the switched power stage circuit 10.

The above description is merely illustrative rather than restrictive. Any equivalent modifications or alterations without departing from the spirit and scope of the present disclosure are intended to be included in the following claims.

What is claimed is:

1. A voltage regulation system, comprising:
   a switched power stage circuit configured to supply power to a load element, wherein a voltage on an output end of the switched power stage circuit is defined as an output voltage;
   a continuous comparator connected to the switched power stage circuit and configured to compare the output voltage and a reference voltage to output a pulse signal;
   a discrete comparator connected to the switched power stage circuit and configured to compare the output voltage and the reference voltage to output the pulse signal;
   a clock generator configured to output a clock signal to the discrete comparator, wherein the discrete comparator is operated based on the clock signal; and
   a controller connected between the discrete comparator and the switched power stage circuit and connected between the continuous comparator and the switched power stage circuit, wherein the controller controls the switched power stage circuit to supply power to the load element based on the pulse signal and selectively dynamically turns on one of the continuous comparator and the discrete comparator and turns off the other of the continuous comparator and the discrete comparator.

2. The voltage regulation system according to claim 1, wherein the controller comprises a counter, and when the continuous comparator is turned on and the discrete comparator is turned off, the counter counts a count value for an interval between the two continuous pulse signals, and when the count value is greater than a first threshold value, the controller turns off the continuous comparator and turns on the discrete comparator.

3. The voltage regulation system according to claim 2, wherein when the continuous comparator is turned off and the discrete comparator is turned on, the counter counts the count value for the interval between the two continuous pulse signals, and when the count value is smaller than a second threshold value, the controller turns on the continuous comparator and turns off the discrete comparator.

4. The voltage regulation system according to claim 3, wherein the second threshold value is smaller than the first threshold value.

5. The voltage regulation system according to claim 3, wherein the counter is configured to count based on the clock signal.

6. The voltage regulation system according to claim 1, wherein the continuous comparator and the discrete comparator are disposed independently of each other.

7. A voltage regulation method, comprising:
   providing a switched power stage circuit to supply power to a load element, wherein a voltage on an output end of the switched power stage circuit is defined as an output voltage;
   selectively turning on one of a continuous comparator and a discrete comparator by using a controller, to compare the output voltage and a reference voltage to output a pulse signal, wherein the discrete comparator is operated based on a clock signal; and
   controlling the switched power stage circuit to supply power to the load element based on the pulse signal.

8. The voltage regulation method according to claim 7, wherein the controller comprises a counter, and the step of selectively turning on one of the continuous comparator and the discrete comparator by using the controller further comprises:
   when the continuous comparator is turned on and the discrete comparator is turned off, using the counter to count a count value for an interval between the two continuous pulse signals, and when the count value is greater than a first threshold value, using the controller to turn off the continuous comparator and turn on the discrete comparator.

9. The voltage regulation method according to claim 8, wherein the step of selectively turning on one of the continuous comparator and the discrete comparator by using the controller further comprises:
   when the continuous comparator is turned off and the discrete comparator is turned on, using the counter to count the count value for the interval between the two continuous pulse signals, and when the count value is smaller than a second threshold value, using the controller to turn on the continuous comparator and turn off the discrete comparator.

10. The voltage regulation method according to claim 9, wherein the second threshold value is smaller than the first threshold value.

11. The voltage regulation method according to claim 9, wherein the counter is configured to count based on the clock signal.

12. The voltage regulation method according to claim 7, wherein the continuous comparator and the discrete comparator are disposed independently of each other.

* * * * *